Nov. 13, 1928. Re. 17,134

J. VODICKA

SOCKET FOR CURTAIN FASTENERS

Original Filed Jan. 16, 1924

John Vodicka, Deceased by
Cinch Manufacturing Corporation
Assignee of John Vodicka
By Rector Hibben Davis & Macauley
Attys.

Witness
Martin H. Olsen.

Reissued Nov. 13, 1928. Re. 17,134

UNITED STATES PATENT OFFICE.

JOHN VODICKA, DECEASED, LATE OF CHICAGO, ILLINOIS, BY CINCH MANUFACTURING CORPORATION, ASSIGNEE, OF CHICAGO, ILLINOIS.

SOCKET FOR CURTAIN FASTENERS.

Original No. 1,567,348, dated December 29, 1925, Serial No. 686,586, filed January 16, 1924. Application for reissue filed December 22, 1927. Serial No. 241,985

The invention is more particularly concerned with automobile curtains but it will be obvious from the following specification that it may also be employed in various other constructions. In the constructions to which the invention relates the curtains are provided with a convenient or desired number of posts and the framework about the openings to be closed with corresponding sockets to receive the posts which are provided with socket-engaging members to interlock therewith. It is desirable for obvious reasons that the socket members project as little as possible beyond the surface of the frame and otherwise be as unobtrusive as possible. The improved socket meets this requirement presenting a neat inconspicuous appearance when the curtain is off, and is then automatically closed against the entrance of matter which might clog it and prevent the entrance of the post.

Figure 1:
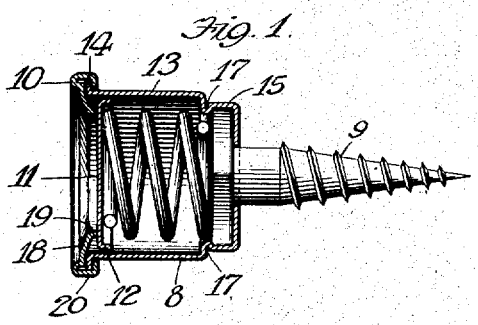
Figure 2:
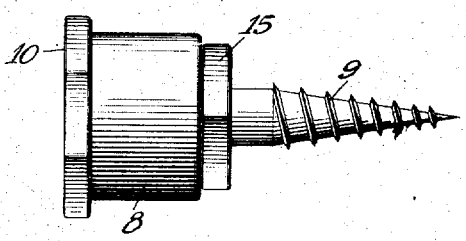
Figure 3:
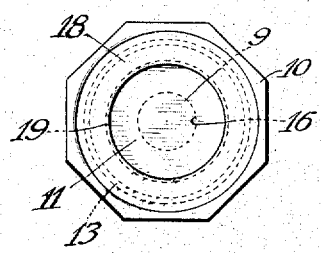
Figure 4:
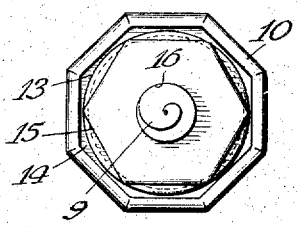
Figure 5:
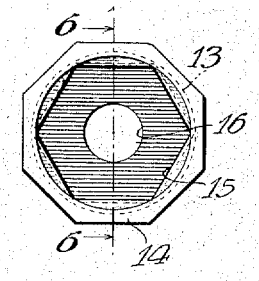
Figure 6:
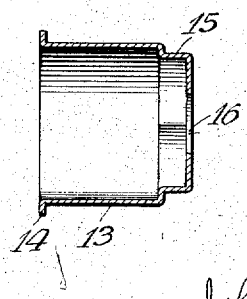

In the drawing accompanying and forming a part of this specification Figure 1 is a central section of a preferred embodiment of the invention partly in elevation; Fig. 2 is a side elevation thereof; Fig. 3 a face or plan view; Fig. 4 a bottom plan; Fig. 5 a face plan of the main socket member or cup; Fig. 6 a section on the line 6—6 of Fig. 5; and Fig. 7 a section of another element of the device.

It has not been thought necessary to show the post member of fastener, a variety of such suitable for use with the improved socket being known in the patented art and on the market.

The socket comprises a cup member 8, an attaching screw 9, an annular catch or flange member 10, a closure plate 11 and a spring 12.

The cup member is struck up out of sheet metal of suitable strength into the shape shown in Figs. 5 and 6 and comprising a cylindrical barrel 13 with an outwardly turned octagonal flange 14 at one end thereof, the other end of the cup being somewhat reduced and of hexagonal or other angular cross section as at 15. The bottom of the cup is centrally perforated at 16 for the reception of the shank of the screw 9. The head of the screw is hexagonal or of other shape to fit the reduced bottom portion of the cup. In assembling the socket the screw is dropped into place and the cup pinched in over the head thereof to provide a number of abutments 17 which prevent axial movement of the screw toward the open end of the cup, as shown by Fig. 1.

Figure 7:
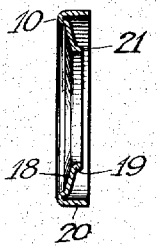

The flange or catch member 10 is struck up in the form shown in Fig. 7 with the inwardly sloping funnel-shaped portion 18 terminating in stiffening flange 19 and the outer octagonal flange 20.

In assembling the socket, after the screw has been secured in position, the spring 12 is inserted, the closure plate 11 put in position with the flange 21 inturned, then the annular catch member is placed over flange 14 and flange 20 turned under the latter. The socket is then complete, ready for use.

In applying the socket to a wooden frame member a hole is sunk in the latter to receive and closely fit the cup, and preferably a hole is drilled to receive the screw.

The socket is then driven home by the application of a wrench or other suitable tool to the tool-receiving means provided at the stud-receiving end of the socket. In this instance the tool-receiving means is the octagonal peripheral edge of the flange 14 with which the tool may cooperate so that when the tool or wrench is turned the socket and screw will be rotated as a unit. In use the closure yields to the post when the latter is inserted and the post is formed or provided with expanding or laterally projecting engaging or hook members which engage the catch flange on the cup. When the post is unlatched the closure plate assists in expelling it and closes the mouth of the cup.

What is claimed is:

1. A socket for curtain fasteners of the class described comprising a cup having an outer flange at its mouth angular in outline, an annular member of similar angular periphery fitting over and embracing the flange and having an inwardly projecting lip, the cup being formed adjacent its bottom with a portion angular in transverse section, a screw, the shank of which projects axially through the bottom of the cup, the head of the screw being angular in outline to fit closely within the angular bottom portion of the cup, a plate closing against the lip of said angular member and a spring interposed between the plate and the bottom of the cup.

2. A socket for curtain fasteners of the class described comprising a cup the peripheral wall of which adjacent the bottom is angular in transverse section, a screw having an angular head of similar shape fitting closely within the angular portion of the cup, the shank of the screw projecting axially through the bottom thereof, the top end of the wall of the cup being formed with an outwardly extending flange of angular outline, an annular member of similar external periphery embracing the flange on the cup and having a lip projecting slightly into the cup, a closure plate normally seating against said lip and a spring intermediate the closure plate and the bottom of the cup.

3. A socket of the class described, comprising a casing or cup having means for receiving a stud at one end thereof, an attaching member having a head located in the bottom of the cup and having a shank passing through the bottom of the cup for securing the socket to a support and means provided by said cup and engaging the head of said attaching member to hold it in fixed engagement therewith.

4. A socket of the class described comprising a casing or cup having tool-receiving means at one end for interlocking engagement with a socket rotating tool and a screw having a head interlocked with the other end of the cup whereby when the socket is rotated the screw will be engaged with a support to which the socket is to be attached.

5. A socket of the class described comprising a casing or cup having a flange at one end, a stud-receiving aperture at the same end as the flange, an attaching screw having a head and a shank and means securing said screw head to the other end of the cup.

6. A socket for curtain fasteners of the class described comprising a cup having means at the mouth end to receive a rotating tool and having an opening through its bottom, a screw extending through said opening, the head of the screw and the wall of the cup adjacent the same being of non-circular shape in cross-section and being interlocked whereby by rotating the cup the screw may be rotated and driven into a supporting body.

7. A socket for curtain fasteners of the class described comprising a cup and a screw, the screw extending from the bottom of the cup and having a head provided with a non-circular rim, the wall of the cup being non-circular in cross-section to engage and interlock with the non-circular rim of the screw head and said cup being provided with a non-circular portion at the top end of the cup for engagement with a rotating tool.

8. A socket for curtain fasteners of the class described comprising a cup and a screw having a head and a shank, the shank extending from the bottom of the cup and the head being interlocked with the cup for rotation therewith, the cup having a non-circular portion for engagement with a rotating tool and an inwardly projecting lip, a plate closing against said lip and a spring interposed between the plate and the head of the screw.

9. A socket of the class described comprising a casing or cup having an outwardly extending flange at its top end and having a plurality of abutments pressed inwardly from the side wall of the cup intermediate the ends thereof, an attaching member having a head seated against said abutments and a bottom presented by said cup and bearing against the head of said attaching member, said head being held between the abutments and said bottom to hold the attaching member in assembly with said cup.

10. A fastening member for curtain fasteners and the like comprising a cup having means associated therewith for engagement with another fastening member, an outwardly extending flange at the top end of the cup, the cup having a bottom provided with a hole therethrough, the cup being non-circular in cross-section adjacent to the bottom, an attaching part having a head non-circular in cross-section and fitting within the non-circular cross-sectional portion of the cup at the bottom so as to be rotatable with the cup, the attaching portion of said attaching part passing through the hole in the bottom and pinched-in portions provided intermediate the ends of the side walls of said cup, said pinched-in portions holding said attaching part against axial movement relative to the said cup.

11. A fastening member for curtain fasteners and the like comprising a casing or cup having means for receiving a cooperating fastener member, an outwardly extending flange at the top end of the cup, a screw having a head located in the bottom of said cup, and means interlocking said head against rotation with relation to said cup whereby when the cup is rotated the screw will be engaged with a support to which the cup is to be attached.

12. A flush type socket including a cup having a bottom provided with a hole therethrough, an outwardly extending flange at the top end of the cup, the cup being non-circular in cross-section adjacent the bottom, an attaching part having a head non-circular in cross-section and fitting within the non-circular cross-section of the cup at the bottom so as to be rotatable with the cup and said attaching part having a shank portion passing through the hole in the bottom for engagement with a fastener-supporting part.

13. A flush type socket including a cup having a bottom provided with a hole therethrough, the cup being non-circular in cross-section adjacent to the bottom, an attaching part having a head non-circular in cross-section and fitting within the non-circular cross-section of the cup at the bottom so as to be rotatable with the cup and the attaching portion of said attaching part passing through the hole in the bottom for engagement with a fastener-supporting part, pinched-in portions of the wall of said cup holding said attaching part against axial movement relative to the said cup, a flange at the open end of said cup having an angular outline to receive a rotating tool and a spring-pressed closure plate normally closing the open end of said cup.

14. A flush type socket unit comprising a cup, a closure reciprocable within the cup, a spring in the cup pressing said closure toward the mouth of the cup and a screw having its head rigidly secured to said cup adjacent to the bottom end thereof so that said screw becomes a part of said unit before securing said cup in a hole in a cup supporting part and said screw providing the means for attaching said cup to the cup supporting part.

CINCH MANUFACTURING CORPORATION,
*Assignee of John Vodicka, Deceased,*
By ARTHUR W. KIMBELL,
*President.*